United States Patent [19]

Muller

[11] 4,057,782
[45] Nov. 8, 1977

[54] LOW ALTITUDE HEAD UP DISPLAY FOR AIRCRAFT

[75] Inventor: Hans Rudolf Muller, Kirkland, Wash.

[73] Assignee: Sundstrand Data Control, Inc., Redmond, Wash.

[21] Appl. No.: 673,794

[22] Filed: Apr. 5, 1976

[51] Int. Cl.$^2$ .............................................. G08C 5/00
[52] U.S. Cl. ............................ 340/27 AT; 244/137 R
[58] Field of Search ................. 340/27 AT; 244/187, 244/137

[56] References Cited

U.S. PATENT DOCUMENTS

| | | | |
|---|---|---|---|
| 2,504,062 | 4/1950 | Alkan | 340/27 AT |
| 3,266,040 | 8/1966 | Doniger | 244/187 |
| 3,497,870 | 2/1970 | Balding | 340/27 AT |
| 3,604,908 | 9/1971 | Loome | 244/187 |

Primary Examiner—Thomas B. Habecker
Attorney, Agent, or Firm—Wegner, Stellman, McCord, Wiles & Wood

[57] ABSTRACT

An aircraft instrument with a reflective screen on which the pilot views a collimated head up display of flight guidance information against a background of the outside world, for low altitude maneuvers. The guidance information includes a pitch stabilized reference indicia and a flight path indicia. The pitch reference and flight path indicia are positioned on the screen in accordance with aircraft operating parameters and pilot inputs to provide for a flare maneuver to touchdown or to direct the pilot in a path parallel with the surface of the ground, as for ejecting cargo.

6 Claims, 5 Drawing Figures

LOW ALTITUDE HEAD UP DISPLAY FOR AIRCRAFT

This invention is concerned with an aircraft instrument which provides a head up display of visual flight path information for the pilot, against the background of the outside world during the transition from approach through flare to touchdown or to and during low level flight parallel with the ground.

An aircraft instrument providing a head up display to guide the pilot along an approach path to a target is known. Such instruments are shown in Gold U.S. Pat. No. 3,128,623, Bateman U.S. Pat. No. 3,654,806 and Bateman et al U.S. Pat. No. 3,686,626. Moreover, it has been proposed that the display of the Bateman and Bateman et al patents provide flare guidance to touchdown.

This invention is concerned with specific aspects of the controls for the displayed indicia during flare maneuver and with a head up display for flight parallel with the ground at a low altitude, as in a cargo dropping maneuver.

The head up display instrument of Bateman and Bateman et al has a semitransparent collimating screen on which a pitch scale and flight path indicia are displayed to guide the pilot to a target or touchdown point. Kirschner U.S. Pat. No. 3,816,005 discloses details of the screen and indicia generation. Muller U.S. Pat. No. 3,851,303 describes the circuitry for developing a complemented pitch signal to drive the pitch scale reference indicia and means for positioning the flight path indicia or bar during approach. The disclosures of these four patents are hereby incorporated in this application.

One feature of this invention is the provision of a head up visual approach aircraft instrument including means responsive to a flare initiate signal for positioning the reference indicia at a flare location on the viewing screen, and means for controlling the location of the flight path indicia in accordance with a flare path command, to guide the pilot in following the flare path. Preferably the reference indicia is pitch stabilized and moved gradually from the approach aiming point to the horizon. In addition, the instrument includes means for mixing approach and flare path command signals in inverse proportions as a function of aircraft altitude for gradually moving the flight path indicia from the approach path to the flare path.

Another feature is that the flare initiate signal is provided by a flare initiate detector responsive to aircraft altitude and approach path angle so that the flare is initiated at an altitude which is a direct function of the approach path angle.

A further feature is that the instrument includes a flare path generator having a source of altitude above ground signal, means for differentiating the altitude signal to provide an altitude rate signal, a source of vertical acceleration signal, a complementary filter combining the altitude rate and vertical acceleration signals to establish a complemented altitude rate signal and means for adding the altitude signal to the complemented altitude rate signal to provide the flare command signal.

Yet a further feature is that the instrument includes means for positioning the indicia on the screen to guide the pilot in a path above and generally parallel to the ground, as for cargo ejection. More particularly, a pitch stabilized first indicia is positioned on the screen in accordance with the outside world horizon to indicate an aiming point for the pilot. A second indicia is positioned on the screen whereby control of the aircraft by the pilot to align the second indicia with the first indicia causes the aircraft to follow a path above and generally parallel to the ground.

Still another feature is the provision of means for displaying an operating mode indicia on the screen to indicate to the pilot that a low altitude path above the ground is directed.

Further features and advantages of the invention will readily be apparent from the following specification and from the drawings, in which.

Figure 1:
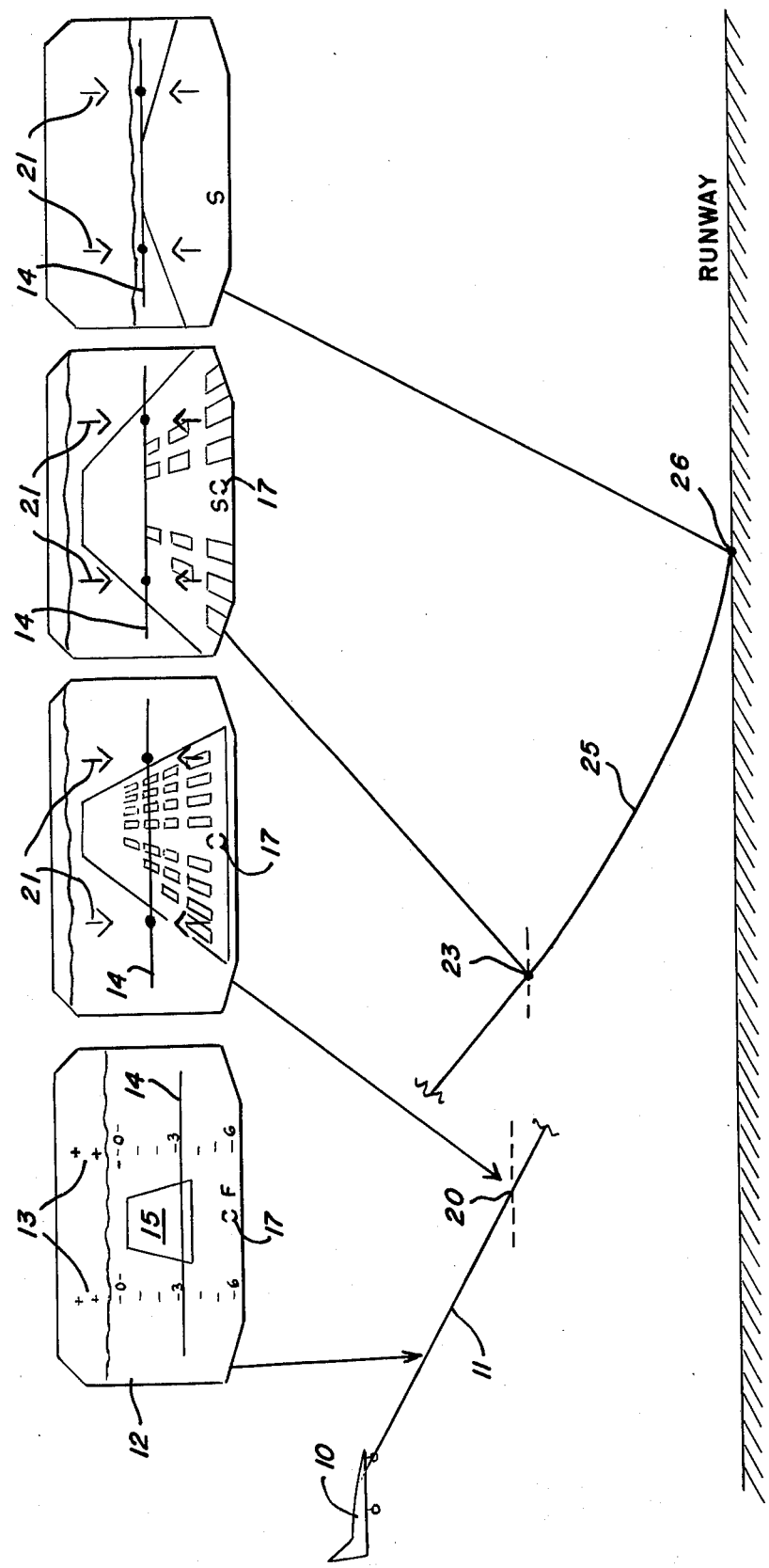
FIG. 1 is a diagram illustrating an aircraft flight profile and sequence of indicia displays during approach and flare to touchdown.

The systems of the patents discussed above provide a visual aid directing the pilot toward a touchdown point during an approach to landing. One aspect of the invention provides for a novel control of the display during the flare maneuver between approach and touchdown. FIG. 1 illustrates the flight profile of an aircraft from approach through flare to touchdown with typical indicia displays at the indicated points in the flight path. The flight path scale and angles are modified for clarity of the illustration.

The aircraft 10 descends along flight path 11. The pilot sees the display 12 with dual pitch scales 13 and a bar 14 which provides a vertically movable flight path indicia. During the approach portion of the maneuver the pilot operates the aircraft to align the bar 14 with the touchdown zone at the near end of runway 15. The vertical scale relative to the touchdown zone indicates the approach angle of the aircraft as $-3°$. At the bottom of screen 12 a symbol 17 and the letter F indicate that the aircraft is slightly over speed.

At a point 20 in the flight path, as 100 feet, the pitch scale 13 of the display is extinguished and a flare indicia 21 illuminated. The dots of the flare indicia are located vertically on the screen at a position corresponding with the selected approach path angle. The pilot maintains the bar 14 aligned with the flare indicia dots and the touchdown point of the runway. Speed symbol 17 indicates that the aircraft is at the correct speed. The aircraft continues to descend along the selected approach path. At the flare initiate point, of the order of 45 or 50 feet of altitude, both the flare symbols 21 and the flight path bar 14 begin to move upwardly toward the horizon. During the flare maneuver the pilot operates the aircraft to keep the bar aligned with the dots of the flare indicia. The movement of the aiming point and flight path indicia cause the plane to follow an exponential path 25 to touchdown on the runway at 26. In the third display for the flare initiate point 23, the letter S and speed symbol 17 indicate that the aircraft is slightly under speed. In the fourth display, as viewed by the pilot at touchdown 26, the flare symbols 21 are on the horizon and the letter S without the speed symbol indicates that the aircraft is substantially under the selected approach speed.

The dual flare symbols 21 at either side of screen 12 aid the pilot in aligning the aircraft with the runway. By controlling the aircraft so that the symbols are symmetrically positioned with respect to the edges of the runway, the aircraft is properly aligned. This is particularly helpful in executing a decrab maneuver as when landing in a crosswind.

In accordance with another aspect of the invention, the display provides guidance to the pilot when approaching and maintaining a flight path at low level, parallel with the ground. More particularly, the maneuver is utilized as in delivering cargo without landing the aircraft. For example, the aircraft may fly at an altitude of the order of 5 feet above the ground and drop cargo carried on a pallet by deploying a parachute through a cargo ejection hatch. The parachute fills and drags the pallet and cargo from the aircraft. This mode of operation, illustrated in FIG. 2 of the drawings, is designated LAPES, an acronym for Low Altitude Parachute Ejection System. Similarly, an aircraft equipped with a winch and cable can pick cargo without landing.

The LAPES maneuver is typically used in delivering supplies where a plane cannot safely land, as in the Polar regions when runways are covered with snow and ice. The maneuver over snow is particularly difficult as there is often no visible horizon and snow does not provide good visual references for the pilot.

The flight path of aircraft 30 includes an approach 31, transition 32 and portion 33 parallel with the surface of the ground 34. The display viewed by the pilot during approach, as at the point 36, is similar to the diaplay during landing approach with pitch scales 13 and flight path indicia bar 14. The legend DROP is displayed in the upper center of the screen 12 indicating to the pilot that the LAPES mode is operative. At an altitude of the order of 100 feet, point 37, the pitch scales and DROP indicia are extinguished and flare symbols 21 illuminated. At an altitude of the order of 50 feet, point 38, the flight path transition 32, similar to the flare of FIG. 1, is initiated. The flare symbols 21 and bar 14 move upwardly toward the horizon. The pilot controls the aircraft to maintain bar 14 aligned with the dots of the flare indicia. In the third display, FIG. 2, the bar 14 is below the dots indicating that the path of the plane is below the desired flight path and that the pilot should increase the speed or pitch the plane up, or both.

At the point 40 the drop altitude is reached and the plane continues in level flight parallel to the ground. The flare indicia 21 are aligned with the horizon and the pilot controls the aircraft to keep the bar 14 aligned with the dots. The speed indicator shows that the plane is slightly above the selected speed. The DROP indicia is again illuminated to inform the pilot that the cargo ejection procedure can be carried out.

Figure 3:
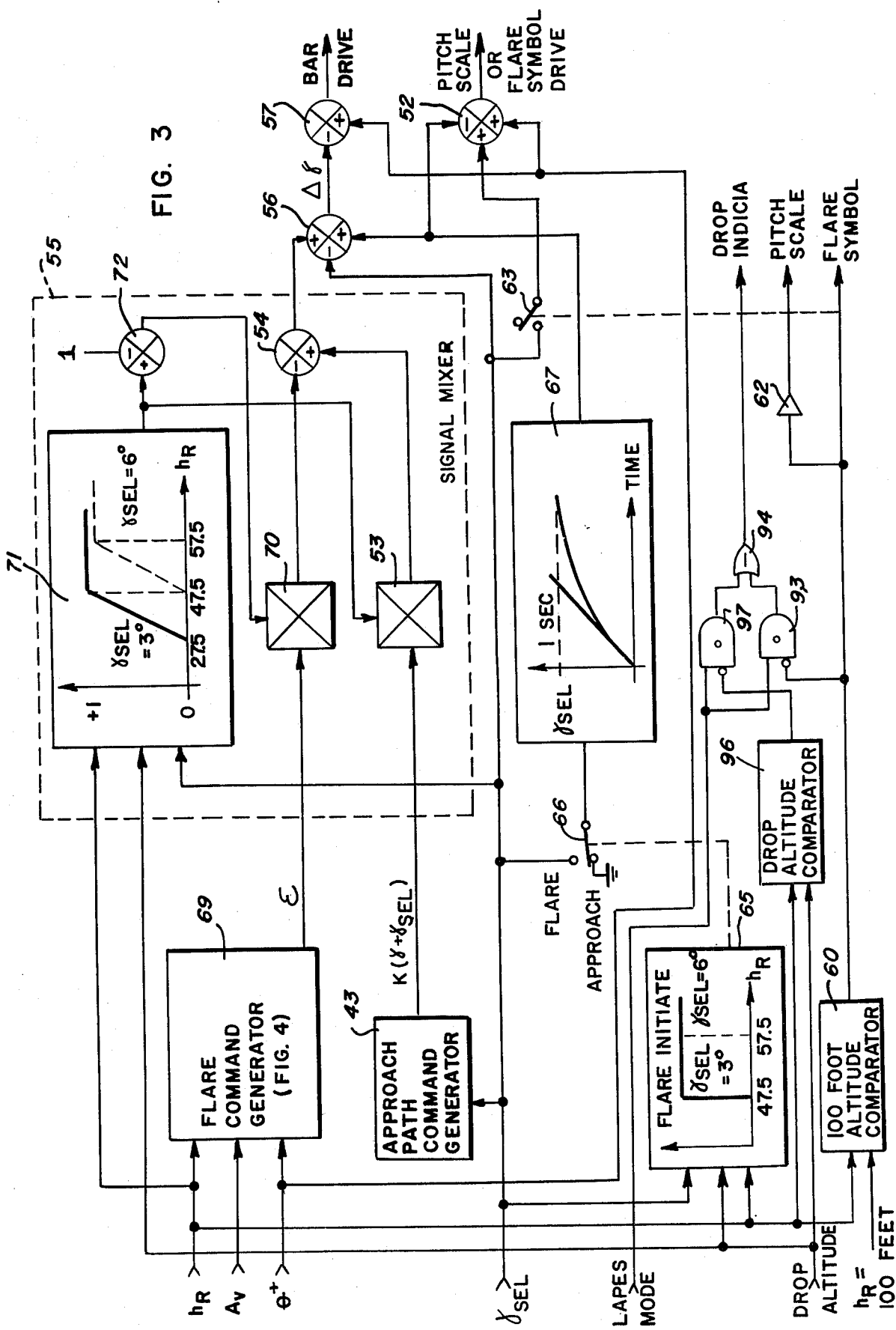
FIG. 3 is a functional block diagram signal processing circuit of the instrument.
Figure 4:
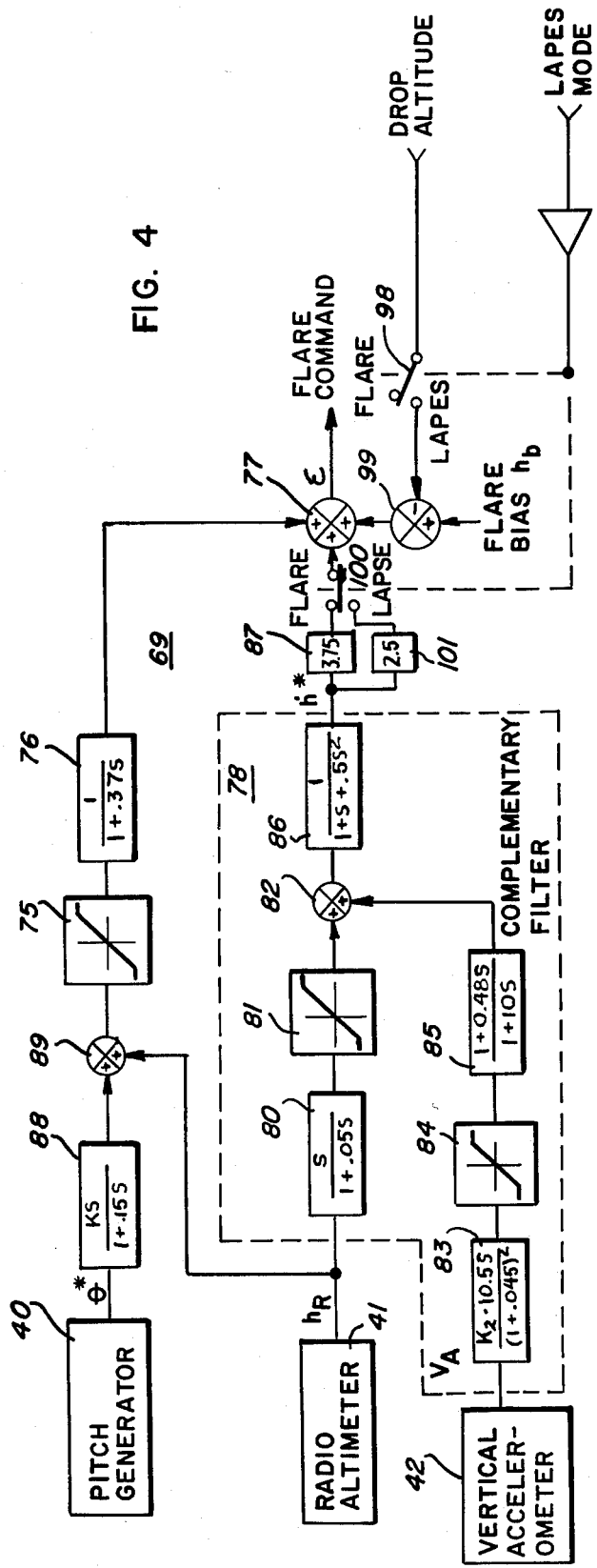
FIG. 4 is a functional block diagram of the flare command signal generator.
Figure 5:
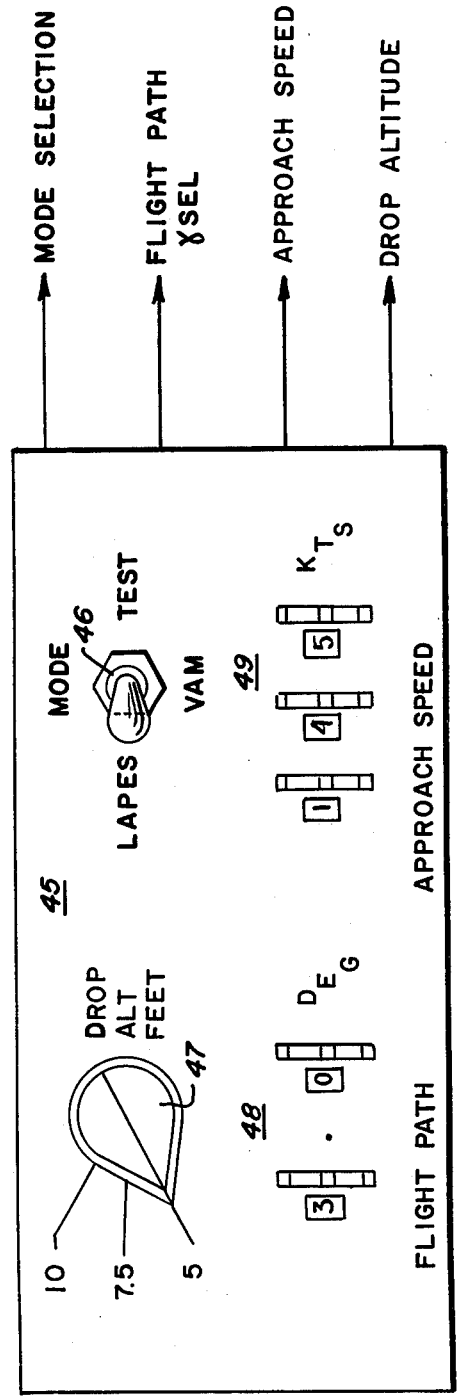
FIG. 5 is a diagrammatic illustration of the pilot control.

FIGS. 3 and 4 illustrate in diagrammatic form the circuits for generating the displays described above, and FIG. 5 shows the pilot control unit which enables selection of the operating mode and other parameters. In the drawings and following discussion, illustrative figures are given for many of the system components and operating conditions.

Several of the inputs are shown as DC analog signals. A calculated pitch signal $\theta^*$ is provided by pitch generator 40 which may be of the character described in Muller U.S. Pat. No. 3,851,303. The altitude of the aircraft above ground, $h_R$ is provided by a radio altimeter 41. Vertical acceleration of the aircraft $V_A$ is provided by vertical accelerometer 42. An approach path command signal $K(\gamma + \gamma_{SEL})$ is derived from command signal generator 43, which may, for example, be one of the circuits of the Muller patent. The pilot control 45, FIG. 5, includes mode selector switch 46 which is positioned for VAM (landing approach) or LAPES operation. A 3-position switch 47 selects the LAPES drop altitude, as 5, 7.5 or 10 feet. Decade switches 48, 49 provide for pilot selection of flight path and approach speed, respectively. The pilot control has analog signal outputs representing flight path ($\gamma_{sel}$), approach speed and drop altitude, and a logic signal output indicating the selected mode.

The signal processing circuit, FIG. 3, has analog output signals which drive the flight path indicia bar 14 and the pitch scale or flare symbols 13, 21. Logic signals control the illumination of the DROP indicia, pitch scale and flare symbols.

During the approach portion of the maneuver, pitch scale 13 is positioned in accordance with the calculated pitch signal $\theta^*$ which is applied to summing junction 52. The other input signals to summing junction 52 are zero. The approach path command signal from generator 43 is connected through multiplier 53 and summing junction 54 of signal mixer 55 to summing junction 56. Miltiplier 53 has a gain of 1 during this portion of the approach. The purpose and operating of signal mixer 55 will be discussed below. $\gamma_{sel}$ is subtracted from the approach path command signal at summing junction 56, the output of which is subtracted from the pitch signal $\theta^*$ at summing junction 57 to provide the bar drive signal. The pilot operates the aircraft to align the bar with the intended touchdown point on the runway.

Figure 2:
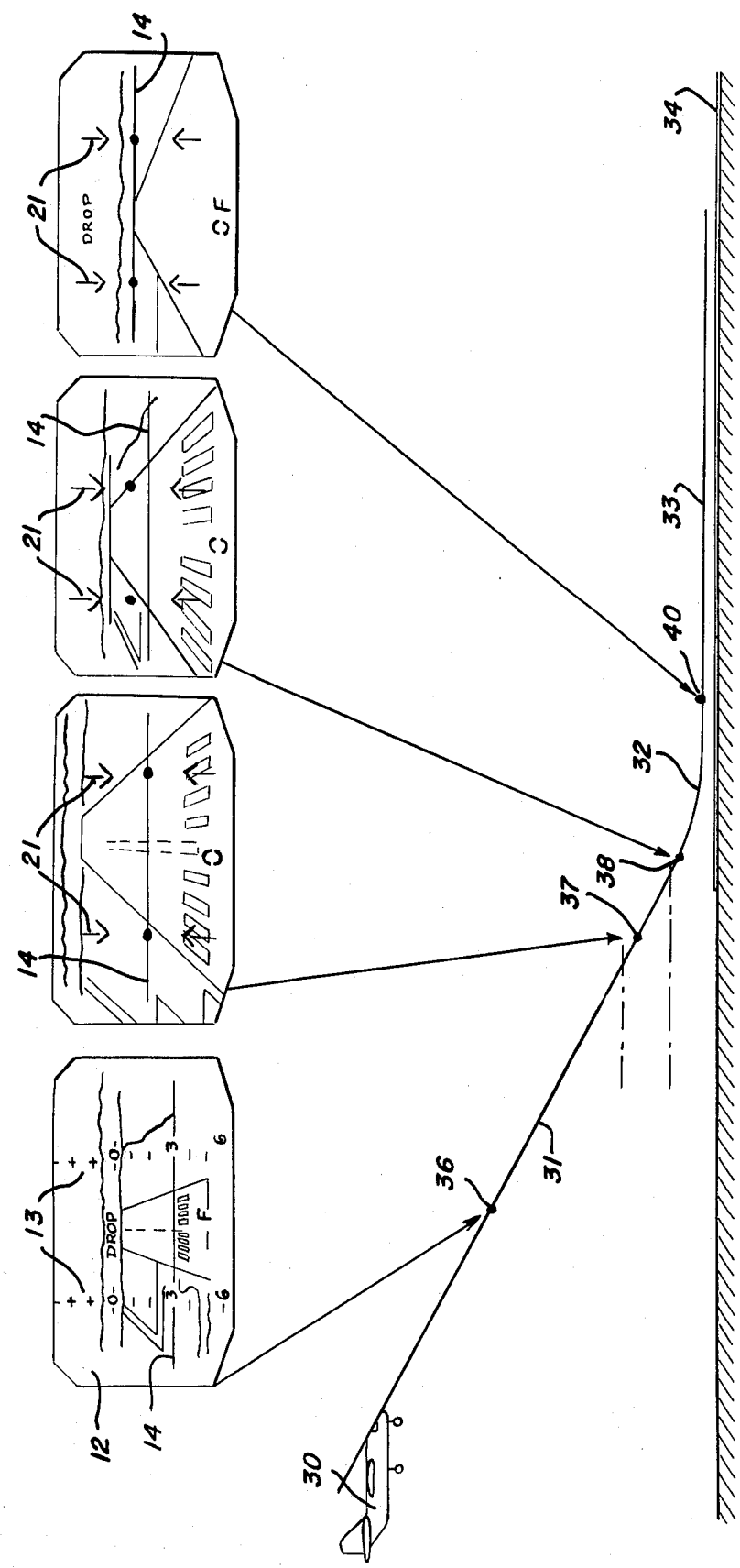
FIG. 2 is a diagram illustrating aircraft flight profile and sequence of indicia displays during approach and flight parallel with the ground.

The selected approach speed is compared with actual air speed and the result of the comparison utilized to illuminate the appropriate speed indicators as shown in FIGS. 1 and 2. The air speed signal processing forms no part of the present invention and is not illustrated in the drawing.

At an altitude sufficiently above the flare initiate altitude to alert the pilot that the flare maneuver will commence shortly, pitch scale 13 is extinguished and flare symbols 21 illuminated. Typically this may occur at an altitude of about 100 feet. Comparator 60 compares the altitude signal with a 100 foot reference signal and at 100 feet generates a logic output signal illuminating the flare symbols. Inverter 62 provides the logic output signal for the pitch scale which is extinguished when the flare symbol is illuminated. The output of altitude comparator 60 closes a switch 63 which adds $\gamma_{sel}$ to $\theta^*$ at summing junction 52. The flare symbol is mechanically aligned with the 0° marking of the pitch scale (see Kirschner U.S. Pat. No. 3,816,005, FIG. 11) and the addition of the $\gamma$SEL signal locates the dot of the flare symbol at the appropriate flight path angle. The pilot continues descent along the approach path with bar 14 superimposed on the dots at the center of flare symbol and the intended touchdown point.

At the flare initiate altitude, both the flare symbol 21 and the bar 14 move upwardly toward the horizon. Concurrently the bar drive signal is gradually transferred from the approach path command signal $K(\gamma + \gamma_{sel})$ to the flare command signal $\epsilon$. A comparator 65 determines when the aircraft has descended to the flare initiation altitude and actuates a switch 66 which connects $\gamma_{sel}$ to the input of an exponential circuit 67 having a one second time constant. The output of exponential circuit 67 starts at zero and increases toward $\gamma_{sel}$ as a function of time. This output signal is connected with summing junctions 52 and 56 where it is subtracted from the $\gamma_{sel}$ inputs. Accordingly, the flare symbol which is controlled by the pitch input $\theta^*$ moves toward the horizon. The bar 14 also moves toward the horizon. The pilot continues operation of the aircraft to maintain the bar aligned with the dots of the flare symbol.

Signal mixer 55 operates following the flare initiate to mix the approach path command signal $K(\gamma + \gamma_{SEL})$ with the flare command signal $\epsilon$ in inverse proportions as a function of aircraft altitude. Flare command signal $\epsilon$ from generator 69 is connected through multiplier 70 with summing junction 54. Control signals from the multipliers 53, 70 are derived from control signal generator 71 in accordance with the aircraft altitude. When the aircraft is above the flare initiate altitude, the output of circuit 71 is 1 and the approach path command signal is transmitted undiminished to the bar drive. At summing junction 72, 1 is subtracted from the output of circuit 71 and provides the control input to multiplier 70 which is cut off above flare initiate altitude. Below flare initiate altitude the output of circuit 71 diminishes toward 0 as a function of altitude. Thus the gain of multiplier 53 is reduced while that of multiplier 70 is increased. Flare command signal $\epsilon$ is connected with a negative input to summing junction 54 as the control factor of multiplier 70 is negative. In a typical system the signal mixing operation is completed as the aircraft descends 15 feet, a time somewhat less than 1.5 seconds.

The flare initiate altitude is preferably selected as a function of the flight path angle. Accordingly, comparator 65 and control signal generator circuits 71 have inputs of $\gamma_{SEL}$. Typically (in LAPES mode), with a flight path of $-3°$ flare will be initiated at about 47.5 feet of altitude, while with a flight path of $-6°$ flare is initiated at 57.5 feet.

The flare command signal generator 69 is illustrated in FIG. 4. The altitude of the aircraft and its sink rate are related to establish an exponential path of touchdown. The altitude signal $h_R$ from radio altimeter 41 is connected through a limiter 75 and noise filter 76 to a summing junction 77. Complementary filter 78 generates a complemented altitude rate signal $\dot{h}^*$ from the altitude and vertical acceleration signals $h_R$ and $V_A$ respectively. The altitude signal is differentiated and connected through limiter 81 with summing junction 82. The vertical acceleration signal is connected through a washout circuit 83, limiter 84 and lead-lag network 85 with summing junction 82. The sum of the two signals is passed through a noise filter 86 to a scaling circuit 87 which establishes the flare time constant, here 3.75 seconds. The scaled altitude rate signal is added to the altitude signal at summing junction 77, the output of which is flare command signal $\epsilon$. A flare bias signal is also added at summing junction 77 to insure that the aircraft has a sink rate at touchdown. With the flare time constant of 3.75 seconds, the flare bias represents an altitude of 7.5 feet and the touchdown sink rate is 2.0 feet per second. The flare command signal may be represented algebraically as $$\epsilon = \dot{h}^*\tau + (H_R + h_{BIAS}),$$

where $\tau$ is the flare time constant.

Preferably a pitch rate signal from differentiator 88 is added to the altitude signal at summing junction 89 providing lead information to improve flyability of the display.

Operation in the LAPES mode requires several additions to the circuit. The LAPES mode logic signal is connected with AND gate 93, FIG. 3, the other input of which is the inverted output of 100 foot altitude comparator 60. In the LAPES mode and above the 100 foot altitude AND gate 93 has an output connected through OR gate 94 to control illumination of the DROP indicia. At the 100 foot altitude, when pitch scale 14 is extinguished and flare symbols 21 illuminated, the DROP indicia is also extinguished. A drop altitude comparator 96 has inputs of aircraft altitude and the selected drop altitude from the pilot control. The output of comparator 96 is HI so long as the aircraft is above drop altitude. When drop altitude is reached, the inverted output of comparator 96 and the LAPES mode signal inputs to AND gate 97 provide an input to OR gate 94 illuminating the DROP indicia.

The selected drop altitude is also connected with the flare initiate comparator 65 and multiplier control signal generator 71 as the initiate altitude must be increased by the drop altitude. For example, if flare is initiated 30 feet for a landing, it is initiated at 47.5 feet in a LAPES maneuver to a 10 foot drop altitude.

A similar altitude bias is provided in the flare command computer. The LAPES mode signal actuates switch 98 (FIG. 4) to add a drop altitude bias to the flare bias at summing junction 99. The selected speed for LAPES is greater than for landing and the flare time constant may be reduced to provide a faster transition. The LAPES mode signal actuates switch 100 to select a scaling circuit 101 with an altitude rate signal time constant of 2.5 seconds.

I claim:
1. A head up visual approach aircraft instrument, having a screen on which the pilot of an aircraft views a collimated display of flight guidance information against a background of the outside world, the display including first indicia movable vertically on the screen as a target for the pilot, second indicia movable vertically on the screen representing the flight path of the aircraft, wherein said instrument comprises:
    means for positioning said first indicia on said screen successively in accordance with an approach path to an outside world aiming point, then along a transition path from said approach path and then in alignment with the horizon to define a path above and generally parallel with the ground; and
    means for positioning said second indicia successively in accordance with an approach path command, and then with a transition path command, manipulation of the aircraft attitude and speed by the pilot to align both said indicia with said outside world aiming point during approach and to align said second indicia with said first indicia during transition and thereafter causing said aircraft to follow said approach and transition paths and to continue in a path above and generally parallel with the ground, as for ejection of cargo from the aircraft while airborne.
2. The aircraft instrument of claim 1 in which said second indicia transition path command is the sum of a signal representing the rate of change of altitude of the aircraft and a signal representing the difference between the altitude above ground and the altitude of said path above ground.

3. The aircraft instrument of claim 1 in which the altitude of said flight path parallel with the ground altitude is selected by the pilot.

4. The aircraft instrument of claim 1 including:
means operable by the pilot for selecting an instrument operating mode directing a flight guidance display for a low altitude path above ground; and
means for displaying operating mode indicia on said screen which indicates to the pilot that a low altitude path above ground has been selected.

5. The aircraft instrument of claim 1 including means for initiating the transition path display of said first and second indicia at an altitude above the ground which is a function of the altitude of the parallel path above ground.

6. The aircraft instrument of claim 1 including means for displaying on said screen indicia indicating to the pilot that the aircraft has descended to and is following the path above and parallel with the ground.

* * * * *

UNITED STATES PATENT AND TRADEMARK OFFICE
CERTIFICATE OF CORRECTION

PATENT NO. : 4,057,782
DATED : November 8, 1977
INVENTOR(S) : Hans Rudolf Muller It is certified that error appears in the above-identified patent and that said Letters Patent are hereby corrected as shown below:

Col. 2, line 44, after "aircraft" insert -- , --.

Col. 6, line 24, after "initiated" insert -- at --.

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*